UNITED STATES PATENT OFFICE.

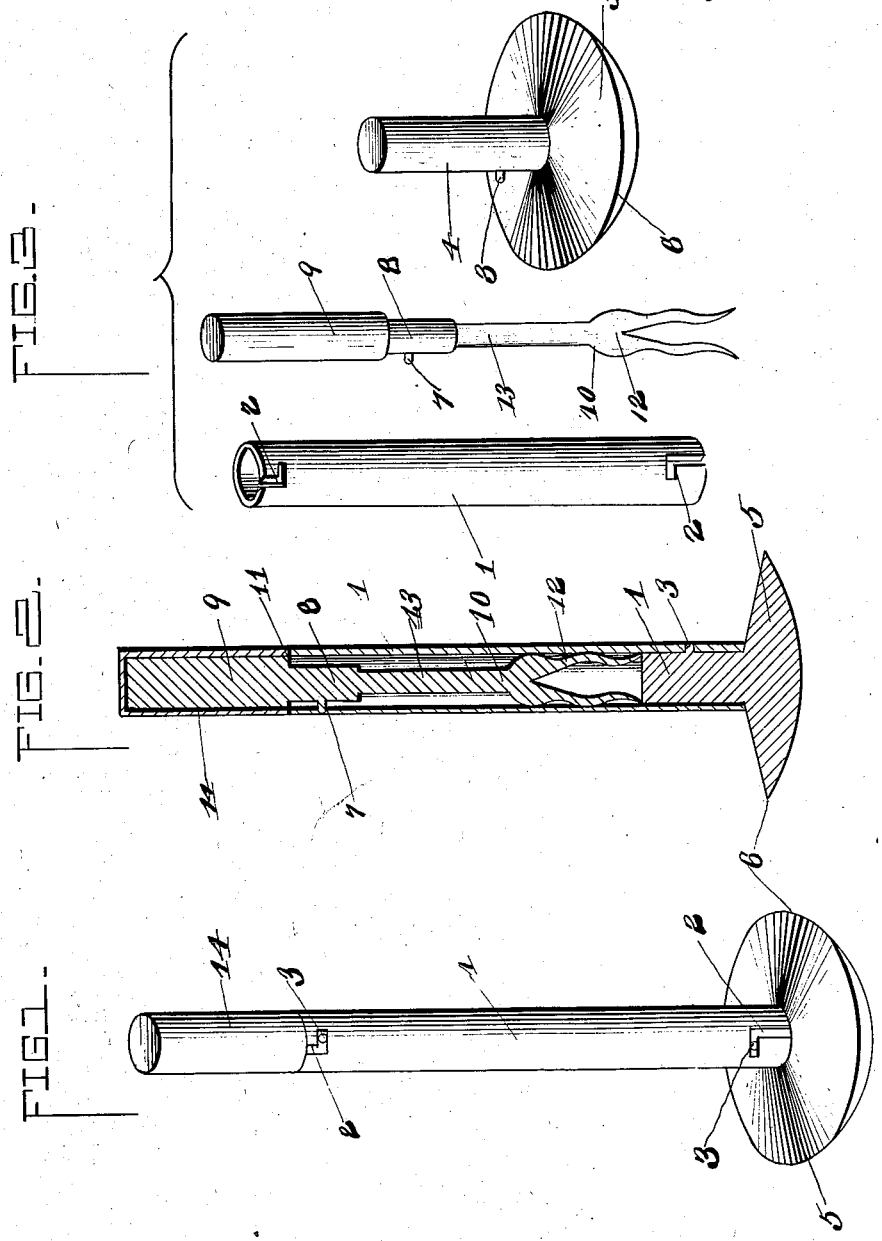

ALONZO H. CARTWRIGHT, OF AMY, WISCONSIN.

COMBINATION POTATO-MASHER, KETTLE-CLEANER, AND VEGETABLE-FORK.

SPECIFICATION forming part of Letters Patent No. 604,965, dated May 31, 1898.

Application filed May 11, 1897. Serial No. 635,983. (No model.)

*To all whom it may concern:*

Be it known that I, ALONZO H. CARTWRIGHT, of Amy, in the county of Dunn and State of Wisconsin, have invented certain new and useful Improvements in a Combination Potato-Masher, Kettle-Cleaner, and Vegetable-Fork; and I do hereby declare the following to be a full, clear, and exact description of the invention, such as will enable others skilled in the art to which it appertains to make and use the same.

This invention relates to a combination implement; and it consists, essentially, of a series of adjustable parts to arrange the device for a potato-masher, kettle-cleaner, and vegetable-fork adapted to be used separately.

The invention further consists of the details of construction and arrangement of the several parts whereby the handle for one implement serves at the same time as a sheath for another, as will be more fully hereinafter described and claimed.

The object of the invention is to form a combination implement wherein the parts may be quickly changed to accommodate the device for different uses, and thereby assemble in one article a series of culinary devices.

In the accompanying drawings, Figure 1 is a perspective view of the improved device shown arranged as a potato-masher. Fig. 2 is a longitudinal central section of the device as shown arranged in Fig. 1. Fig. 3 is a detail perspective view of the parts of the device shown separated.

Referring to the drawings, wherein similar numerals of reference are employed to indicate corresponding parts in the several views, the numeral 1 designates a tubular sleeve having in opposite ends thereof vertically-arranged bayonet-slots 2. A pin 3, projecting outwardly from a shank 4 of a combined potato-masher and kettle-cleaner 5, engages a slot 2 at one end of the said sleeve 1. The said shank extends centrally from the potato-masher or kettle-cleaner 5, and when the pin 3 engages the said slot a bayonet-joint is formed and the device held intact with the sleeve 1. The said combined potato-masher and kettle-cleaner is in the form of a disk having convex sides converging to an outer edge 6, the one convex side being free to be used in mashing potatoes, and the edge 6 forms a scraper for cleaning pots and kettles. When the said disk is arranged in connection with the sleeve 1, the latter is grasped and the entire device is vertically reciprocated or otherwise manipulated in crushing or mashing potatoes or other vegetables. When the said device is to be used as a pot or kettle cleaner, the shank 4 is disconnected from the sleeve 1 and may be grasped by the hand and conveniently used for the purpose without elongated projections which would interfere with this operation. The opposite slot 2 is adapted to receive a pin 7, projecting from the reduced portion 8 of the handle 9 of a fork 10, the said reduced portion 8 forming a shoulder 11, which snugly abuts against the adjacent end of the sleeve and enlarged part of the handle, and when the parts are so arranged forms a flush joint with the sleeve. The said fork consists of a piece of metal having a broadened end, which is triangularly bifurcated to form tines 12, and from the same extends a shank 13, merging into the reduced portion 8 of the handle 9, and the said handle 9 is adapted to be inclosed by a sleeve 14 to insure the close fitting of the several parts, as heretofore set forth, and also adapt the fork and its various parts to be constructed of flat metal, if desired. When it is desired to use the fork, the pin 7 is removed from the slot 2 and the entire device withdrawn from the sleeve. The parts are of such dimension as to snugly fit within the sleeve and will not be exteriorly exposed.

It is obviously apparent that many minor changes in the details of construction and arrangement of the several parts might be made and substituted without in the least departing from the nature or spirit of the invention.

Having thus described the invention, what is claimed as new is—

1. A combined implement of the character set forth, comprising a sleeve, a combined potato-masher and kettle-cleaner adapted to be removably attached to one end of the sleeve, and a fork detachably inclosed within the said sleeve and inserted and withdrawn through the opposite end thereof, said sleeve serving both as a sheath for the fork and as a handle for the potato-masher, substantially as and for the purposes specified.

2. In a device of the character set forth, the combination with a sleeve, of a fork removably mounted therein and having a portion of the handle adapted to lie flush with the said sleeve, and a combined masher and scraper having a shank or stem adapted to be inserted and secured in the opposite end of the sleeve, substantially as and for the purposes specified.

In testimony whereof I have signed this specification in the presence of two subscribing witnesses.

ALONZO H. CARTWRIGHT.

Witnesses:
 CARL PIEPER,
 TIM. MURPHY.